United States Patent Office 2,737,494
Patented Mar. 6, 1956

2,737,494
STABLE GREASES CONTAINING SYNTHETIC GELLING AGENTS

Frederick C. Frank, Barnsboro, N. J., assignor to Socony Mobil Oil Company, Inc., a corporation of New York No Drawing. Application September 27, 1952, Serial No. 311,955

12 Claims. (Cl. 252—39)

This invention relates to lubricating grease compositions suitable for use over a wide range of operating conditions. More specifically, the present invention is concerned with the stabilization of grease compositions such that they are stable when used or stored at temperatures varying from about 32° F. to about 500° F.

Recently, a new and novel group of grease compositions has been developed from metal soaps of partial esters and partial amides of acidic copolymers of alpha, beta unsaturated polycarboxylic acids or their anhydrides with low molecular weight compounds having a terminal vinyl group ($-CH=CH_2$). These grease compositions are described in detail by John J. Giammaria in application Serial No. 311,960 now Patent No. 2,698,297, filed concurrently herewith. While the grease compositions described in said application have an excellent combination of properties and have outstanding performance characteristics, they tend to stiffen on standing. That is, the greases can be milled to a smooth, plastic mass but, on standing they often become stiff and elastic or rubbery. It has now been discovered that certain polymeric materials, incorporated into these greases in relatively small proportions, effectively reduce or even eliminate this undesirable characteristic. In addition, in some instances the plasticizing effect of the polymeric material increases the dropping point of the grease.

It is an object of this invention, therefore, to provide greases containing said metal soaps of acidic copolymers, having a high degree of stability. It is also an object of this invention to provide stable greases having high dropping points, of the order of 400° F. and higher. Other objects will be apparent from the following description.

As indicated, the greases of this invention contain polymeric materials which serve as stabilizing agents. Effective polymeric materials have average molecular weights from about 10,000 to about 100,000, and include the following:

(1) Olefin polymers, such as polymers of alpha monoolefins having up to about eighteen carbon atoms per molecule, typical of which are polymers of propylene, isobutylene, decene; particularly polypropylenes having an average molecular weight of about 100,000, and polyisobutylenes having an average molecular weight of about 100,000; and alkylated polystyrenes, particularly polystyrenes alkylated with $C_9$–$C_{12}$ olefins;

(2) Ester polymers such as polymers of alkyl methacrylates, alkyl acrylates, vinyl esters;

(3) Esterified reaction products of an alpha, beta-unsaturated dicarboxylic acid anhydride and vinyl acetate, which reactions products are esterified with a saturated aliphatic alcohol containing between about 12 and about 18 carbon atoms in a straight chain; such esterified products are described by J. J. Giammaria in copending application Serial No. 744,802, filed April 29, 1947, now Patent No. 2,616,851, issued November 4, 1952;

(4) Products obtained by copolymerizing vinyl and/or alkyl ethers with alpha, beta-unsaturated dicarboxylic acids or their anhydrides, such product being esterified with primary, normal saturated aliphatic alcohols containing up to about eighteen carbon atoms per molecule; these esterified products are described by J. J. Giammaria in copending application Serial No. 77,288, filed February 18, 1949;

(5) Esters of thiophene-modified, maleic anhydride-styrene copolymers; described by F. P. Otto and O. M. Reiff in application Serial No. 118,708, filed September 29, 1949, and now Patent No. 2,600,798, issued June 17, 1952.

The polymeric materials are used in amounts of the order of from about one per cent to about ten per cent, by weight, of the total grease composition. Preferably, the amount of polymeric material will fall within the range of two to five per cent.

As explained in detail in said application Serial No. 311,960, the novel soaps of the greases there described are metal soaps of partial esters and of partial amides obtained by reaction of an aliphatic alcohol having at least about eight carbon atoms per molecule or an aliphatic amine having at least about eight carbon atoms per molecule, respectively, with an acidic copolymer of a lower molecular weight vinyl compound, such as styrene or vinyl acetate, with an alpha, beta unsaturated polycarboxylic acid or anhydride. Illustrative of such metal soaps are those shown in the following non-limiting examples.

EXAMPLE I

Seventy-three and one-half parts by weight of styrene and 49 parts by weight of maleic anhydride were dissolved in 1000 parts by weight of toluene. The resulting solution was heated to 150° F. and 1.23 parts by weight of benzoyl peroxide were added. Heating was continued to about 200° F. where reaction took place as evidenced by clouding of the solution. Heating at reflux (about 220° F.) was continued for one hour. The styrene-maleic anhydride thus formed was partially esterified with a mixture of 93.6 parts by weight of Lorol 5 alcohol and 9.9 parts by weight of n-octadecanol, using 4.54 parts of paratoluene sulfonic acid as catalyst, at 300° F. for two hours. The resulting partial ester had a neutralization number of 121.0.

Lorol 5 alcohol is a mixture comprising 2.8 per cent n-decanol, 61.0 per cent n-dodecanol, 21 per cent of n-tetradecanol, 11.0 per cent of n-hexadecanol and 2.2 per cent of n-octadecanol.

Eighty parts by weight of the partial ester, described above, 371 parts by weight of an acid-refined naphthenic oil (232 S. U. S. at 100° F.) and 8.7 parts by weight of $LiOH.H_2O$ dissolved in 78.0 parts by weight of water, were mixed in a suitable grease kettle and heated to 400° F. over a four hour period. The resulting grease was stirred while cooling to room temperature (80° F.). The soap concentration was eighteen per cent.

A portion of the resulting grease was blended with ten per cent by weight of polyisobutylene (20 per cent polymer in oil; average molecular weight of polymer, about 100,000), and with sufficient oil to reduce the soap content to sixteen per cent. The final grease did not stiffen and actually showed a higher dropping point. The dropping point of the grease without polyisobutylene was 280° F.; whereas, the dropping point of the grease with polyisobutylene was above 400° F.

EXAMPLE II

Eighty parts by weight of a partial ester of a styrene-maleic anhydride copolymer and n-octadecanol, prepared in the same manner as the partial ester described in Example I, 360 parts by weight of a solvent-refined naphthenic oil (514 S. U. S. at 100° F.), 23 parts by weight of Ba(OH)₂.8H₂O and 10 parts by weight of water were mixed in a grease kettle and heated to 350° F. during a four hour period, and were maintained at 350° F. for a one hour period. The resulting grease was then stirred while it was cooled to room temperature (about 70–80° F.). The soap concentration of the grease was twenty per cent.

Two hundred and sixty parts by weight of the grease described immediately above were blended with thirteen parts by weight of polyisobutylene (described in Example I), which reduced the soap concentration to nineteen per cent. This grease was smooth and bright and showed no stiffening on standing.

The following illustrative, and non-limiting examples, serve to demonstrate the improvement realized by incorporating a stabilizing agent into a grease of the type described in Examples I and II, above. These illustrations are provided below in tabulated form in Table 1.

By way of explanation, the polyisobutylene, polymethylmethacrylate and alkylated polystyrene polymers shown in Table 1, had average molecular weight of about 100,000.

Also, Stenol is a commercial prodct substantially all of which is n-octadecanol.

*Table 1*

| Example No. | Grease | | | Stabilizing Agent | | Stiff After 24 Hrs. | Dropping Point, °F. [1] |
|---|---|---|---|---|---|---|---|
| | Metal | Alcohol Or Amine | Acid Copolymer | Polymer | Concentration, Percent Wt. | | |
| 1 | Barium | Lorol-5 Alcohol | Styrene-Maleic Anhydride | | | | 400+ |
| 2 | do | do | do | Polyisobutylene | 5 (20% Polymer in oil) | No | 400+ |
| 3 | Lithium | do | do | | | Yes | 280 |
| 4 | do | do | do | Polyisobutylene | 10 (20% Polymer in oil) | No | 400+ |
| 5 | Calcium | do | do | | | Yes | 230 |
| 6 | do | do | do | Isobutyl Phenol | 2 | Yes | 230 |
| 7 | do | do | do | Polyisobutylene | 10 (20% Polymer in oil) | No | 400+ |
| 8 | do | Lorol-5 Alcohol (75% by Wt.) and Stenol (25% by Wt.) | do | | | Yes | 265 |
| 9 | do | do | do | Polyisobutylene | 10 (20% Polymer in oil) | No | 400+ |
| 10 | Lithium | Lorol-5 Alcohol (90% by Wt.) and Stenol (10% by Wt.) | do | | | Yes—Very Heavy | 375 |
| 11 | do | do | do | Polyisobutylene | 10 (20% Polymer in oil) | No | 475 |
| 12 | do | do | do | Alkylated Polystyrene | do | No | 300 |
| 13 | do | do | do | Polymethylmethacrylate | 5 (40% Polymer in oil) | No | 425 |
| 14 | Lithium (80% by Wt.) | do | do | | | No | 260 |
| 15 | Lithium Salt of 12-hydroxystearic Acid (20% by Wt.) | do | do | Polyisobutylene | 10 (20% Polymer in oil) | No | 378 |
| 16 | Barium | Lorol-5 Alcohol | do | | | Yes | 400+ |
| 17 | do | do | do | Polyisobutylene | 5 (20% Polymer in oil) | No | 400+ |
| 18 | Calcium | do | do | | | No | 400 |
| 19 | do | do | do | Polyisobutylene | 10 (20% Polymer in oil) | No | 500+ |
| 20 | do | do | do | Alkylated Polystyrene | do | No | 450 |
| 21 | do | do | do | | | Yes | 300 |
| 22 | do | do | do | Polyisobutylene | 10 (20% Polymer in oil) | No | 500 |
| 23 | do | do | do | Alkylated Polystyrene | do | No | 465 |
| 24 | do | do | do | Polymethylmethacrylate | 5 (40% Polymer in oil) | No | 475 |
| 25 | Lithium soaps of conventional fatty acids | | | | | No | 375 |
| 26 | do | | | Polyisobutylene | 10 (20% Polymer in oil) | No | 375 |
| 27 | do | | | Alkylated Polystyrene | do | No | 375 |
| 28 | do | | | Polymethylmethacrylate | 5 (40% Polymer in oil) | No | 375 |

[1] A. S. T. M. designation: D 566-42.

Several observations can be made from the tabulation of data given above. Examples 1 and 2 show the effect of an isobutylene polymer on a grease containing a barium soap. Incorporation of the polymer resulted in a grease of lower soap content, 19% in contrast to 20%, and one which was smooth and bright, and showed no stiffening on standing.

Examples 3 and 4 reveal an increase in dropping point, as well as elimination of stiffness, resulting from addition of the isobutylene polymer.

Examples 5 and 6 show that isobutyl phenol is ineffective in eliminating stiffness. In contrast, Example 7 shows an isobutylene polymer eliminates stiffness and increases the dropping point markedly, from 230 to more than 400. Examples 8 and 9 provide a similar demonstration.

Examples 10 through 13 show that stiffness is banished by each of the polymers incorporated in the grease. However, the dropping point of the grease is increased substantially by an isobutylene polymer and by a methyl methacrylate polymer, whereas an alkylated styrene polymer causes a decrease in dropping point.

Examples 14 and 15 show the effect of an isobutylene polymer on a grease prepared from a mixture of a soap of a partial ester of an acidic copolymer and a soap of a conventional fatty acid. While the grease of Example 14 did not stiffen, its dropping point was materially improved, from 260° F. to 378° F., by the polymer.

Examples 16 and 17 also show an elimination of stiffness by the isobutylene polymer. The grease of Example 16 stiffened, and this seemed to increase with time.

Examples 18 through 20 reveal an increase in dropping point by the addition of a polymer.

Examples 21 through 24 show elimination of stiffness and increase in dropping point. It should be noted that the calcium grease of Example 20 did not stiffen, whereas the related grease in Example 21 did stiffen. This difference in behavior can be attributed to the fact that the soap of Example 18 was esterified to the extent of fifty-five per cent and the soap of Example 21 was esterified to the extent of sixty per cent.

Examples 25 through 28 are included in order to show the effect of the several polymers, used in the preceding examples, upon a current commercial grease containing soaps of conventional fatty acids. In no instance was the dropping point of the grease increased by the polymer.

It is to be understood that the greases can also contain other characterizing materials in addition to the polymer stabilizing agents. For example, the greases can contain grease antioxidants such as amines, phenols, sulfides, etc., and lubricity improving agents such as glycerine, free fat, free fatty acids, esters of alkyl and/or aryl acids, sulfurized fats, lead soaps, etc. All such well-known characterizing materials do not detract from the beneficial properties imparted by the polymers; rather, such characterizing materials serve to impart their customary properties to the grease.

With regard to preparing the greases of this invention, the polymer is added at the last stages of the preparation. That is, after the grease containing a metal soap, or soaps, of a partial ester or partial amide of the type described above, has been prepared, the polymer is added and is thoroughly dispersed or admixed therein. No improvement is realized when the polymer is incorporated during the preparation of the grease.

I claim:

1. A grease comprising an oleaginous vehicle and a salt in an amount sufficient to thicken said vehicle to form a grease, said salt being a metal salt of an acidic reaction product obtained by reaction of a compound selected from the group consisting of an aliphatic monohydric alcohol having at least about eight carbon atoms per molecule and an aliphatic monoamine having at least about eight carbon atoms per molecule, with an acidic copolymer of an alpha, beta unsaturated polycarboxylic acid and a low molecular weight organic compound having a terminal vinyl group and having less than about ten carbon atoms per molecule, such that from about fifty to about ninety per cent of the carboxyl groups of the acidic copolymer are reacted with said compound, said acidic copolymer having a molecular weight above about 1000, the metal of said salt being selected from the group consisting of metals of Groups I through III of Mendeleeff's Periodic System and a small amount, sufficient to reduce the tendency to stiffen on standing of a grease comprised of said oleaginous vehicle and said salt, of a polymeric material having an average molecular weight from about 10,000 to about 100,000, polymeric material being selected from the group consisting of an olefin polymer; an ester polymer; an esterified copolymer of an alpha, beta-unsaturated dicarboxylic acid anhydride and vinyl acetate; an esterified copolymer of a vinyl ether and an alpha, beta-unsaturated dicarboxylic acid anhydride; an esterified copolymer of an alkyl ether and an alpha, beta-unsaturated dicarboxylic anhydride; and an ester of a thiophene-modified, maleic anhydride-styrene copolymer.

2. A grease comprising an oleaginous vehicle, a salt (1) of a fatty acid having ten to twenty-two carbon atoms per molecule and a salt (2), in an amount sufficient to thicken said vehicle to form a grease, said salt (2) being a metal salt of an acidic reaction product obtained by reaction of a compound selected from the group consisting of an aliphatic monohydric alcohol having at least about eight carbon atoms per molecule and an aliphatic monoamine having at least about eight carbon atoms per molecule, with an acidic polymer of an alpha, beta unsaturated polycarboxylic acid and a low molecular weight organic compound having a terminal vinyl group and having less than about ten carbon atoms per molecule, such that from about fifty to about ninety per cent of the carboxyl groups of the acidic copolymer are reacted with said compound, said acidic copolymer having a molecular weight above about 1000, the metal of said salt being selected from the group consisting of metals of Groups I through III of Mendeleeff's Periodic System, and a small amount sufficient to reduce the tendency to stiffen on standing of a grease comprised of said oleaginous vehicle and said salts, of a polymeric material having an average molecular weight from about 10,000 to about 100,000, polymeric material being selected from the group consisting of an olefin polymer; an ester polymer; an esterified copolymer of an alpha, beta-unsaturated dicarboxylic acid anhydride and vinyl acetate; an esterified copolymer of a vinyl ether and an alpha, beta-unsaturated dicarboxylic acid anhydride; an esterified copolymer of an alkyl ether and an alpha, beta-unsaturated dicarboxylic anhydride; and an ester of a thiophene-modified, maleic anhydride-styrene copolymer.

3. A grease comprising an oleaginous vehicle, a salt (1) of a fatty acid having ten to twenty-two carbon atoms per molecule, a salt (2) of a fatty acid having less than about six carbon atoms per molecule and a salt (3), in an amount sufficient to thicken said vehicle to form a grease, said salt (3) being a metal salt of an acidic reaction product obtained by reaction of a compound selected from the group consisting of an aliphatic monohydric alcohol having at least about eight carbon atoms per molecule and an aliphatic monoamine having at least about eight carbon atoms per molecule, with an acidic copolymer of an alpha, beta unsaturated polycarboxylic acid and a low molecular weight organic compound having a terminal vinyl group and having less than about ten carbons atoms per molecule, such that from about fifty to about ninety per cent of the carboxyl groups of the acidic copolymer are reacted with said compound, said acidic copolymer having a molecular weight above about 1000, the metal of said salt being selected from the group consisting of metals of Groups I through III of Mendeleeff's Periodic System, and a small amount, sufficient to reduce the tendency to stiffen on standing of a grease comprised of said oleaginous vehicle and said salts, of a polymeric material having an average molecular weight from about 10,000 to about 100,000, polymeric material being selected from the group consisting of an olefin polymer; an ester polymer, an esterified copolymer of an alpha, beta-unsaturated dicarboxylic acid anhydride and vinyl acetate; an esterified copolymer of a vinyl ether and an alpha, beta-unsaturated dicarboxylic acid anhydride; an esterified copolymer of an alkyl ether and an alpha- beta-unsaturated dicarboxylic anhydride; and an ester of a tiophene-modified, maleic anhydride-styrene copolymer.

4. A grease as defined by claim 1 wherein the polymer is an isobutylene polymer having an average molecular weight of about 100,000.

5. A grease as defined by claim 1 wherein the polymer is a methyl methacrylate polymer having an average molecular weight of about 100,000.

6. A grease as defined by claim 1 wherein the polymer is an alkylated polystyrene having an average molecular weight of about 100,000.

7. A grease as defined by claim 1 wherein the polymer is present in an amount between about one and about ten per cent.

8. A grease comprising a mineral oil of lubricating viscosity, and lithium salts in an amount sufficient to thicken said oil to form a grease, said salts being lithium salts of partial esters obtained by reaction of a mixture of aliphatic alcohols having from ten to eighteen carbon atoms per molecule and predominantly dodecanol and octadecanol with an acidic copolymer of styrene and maleic anhydride having a molecular weight above about 1000, such that about fifty per cent of the carboxyl groups of the acidic copolymer are reacted with said alcohols; said grease having incorporated therewith, a small amount sufficient to reduce the tendency to stiffen on standing of said oil and said salts, of a polyisobutylene having an average molecular weight of about 100,000.

9. A grease comprising a mineral oil of lubricating viscosity, and calcium salts in an amount sufficient to thicken said oil to form a grease, said salts being calcium salts of partial esters obtained by reaction of a mixture of aliphatic alcohols having from ten to eighteen carbon atoms per molecule and predominantly dodecanol and octadecanol with an acidic copolymer of styrene and maleic anhydride having a molecular weight above about 1000, such that about fifty per cent of the carboxyl groups of the acidic copolymer are reacted with said alcohols; said grease having incorporated therewith, a small amount sufficient to reduce the tendency to stiffen on standing of said oil and said salts, of a polyisobutylene having an average molecular weight of about 100,000.

10. A grease comprising a mineral oil of lubricating viscosity, and calcium salts in an amount sufficient to thicken said oil to form a grease, said salts being calcium salts of partial esters obtained by reaction of a mixture of aliphatic alcohols having from ten to eighteen carbon atoms per molecule and predominantly dodecanol with an acidic copolymer of styrene and maleic anhydride having a molecular weight above about 1000, such that about fifty per cent of the carboxyl groups of the acidic copolymer are reacted with said alcohols; said grease having incorporated therewith, a small amount sufficient to reduce the tendency to stiffen on standing of said oil and said salts, of a polymethylmethacrylate having an average molecular weight of about 100,000.

11. A grease comprising a mineral oil of lubricating viscosity, and calcium salts in an amount sufficient to thicken said oil to form a grease, said salts being calcium salts of partial esters obtained by reaction of a mixture of aliphatic alcohols having from ten to eighteen carbon atoms per molecule and predominantly dodecanol with an acidic copolymer of styrene and maleic anhydride, such that about fifty per cent of the carboxyl groups of the acidic copolymer are reacted with said alcohols; said grease having incorporated therewith, a small amount sufficient to reduce the tendency to stiffen on standing of said oil and said salts, of an alkylated polystyrene having an average molecular weight of about 100,000.

12. A grease comprising a mineral oil of lubricating viscosity, and lithium 12-hydroxy stearate (1) and lithium salts (2) in an amount sufficient to thicken said oil to form a grease, said salts (2) being lithium salts of partial esters obtained by reaction of a mixture of aliphatic alcohols having from ten to eighteen carbon atoms per molecule and predominantly dodecanol and octadecanol with an acidic copolymer of styrene and maleic anhydride having a molecular weight above about 1000, such that about fifty per cent of the carboxyl groups of the acidic copolymer are reacted with said alcohols; said grease having incorporated therewith, a small amount sufficient to reduce the tendency to stiffen on standing of said oil and said salts (1) and (2), of a polyisobutylene having an average molecular weight of about 100,000.

References Cited in the file of this patent

UNITED STATES PATENTS

| Number | Name | Date |
|---|---|---|
| 2,197,263 | Carmichael et al. | Apr. 16, 1940 |
| 2,274,673 | Earle | Mar. 3, 1942 |
| 2,491,028 | Beerbower et al. | Dec. 13, 1949 |
| 2,615,845 | Lippencott et al. | Oct. 28, 1952 |
| 2,634,256 | Sparks et al. | Apr. 7, 1953 |
| 2,637,698 | Tutwiler | May 5, 1953 |